United States Patent
Wieclawski

[19]

[11] Patent Number: 6,152,515
[45] Date of Patent: Nov. 28, 2000

[54] ASSEMBLY FOR MOUNTING A SEAT ON A VEHICLE

[75] Inventor: Stanislaw Andrzej Wieclawski, Gross-Gerau, Germany

[73] Assignee: Lear Corporation, Detroit, Mich.

[21] Appl. No.: 09/312,941

[22] Filed: May 17, 1999

[30] Foreign Application Priority Data

May 18, 1998 [DE] Germany ............... 198 22 262

[51] Int. Cl.$^7$ ...................................... B60N 2/02
[52] U.S. Cl. .............................................. 296/65.03
[58] Field of Search ................................ 296/65.03

[56] References Cited

U.S. PATENT DOCUMENTS

| | | | |
|---|---|---|---|
| 5,498,051 | 3/1996 | Sponsler et al. | 296/65.1 |
| 5,562,322 | 10/1996 | Christoffel | 296/65.1 |
| 5,626,391 | 5/1997 | Miller et al. | 297/331 |
| 5,634,686 | 6/1997 | Okazaki | 297/336 |
| 5,775,763 | 7/1998 | Glinter et al. | 296/65.1 |
| 6,022,166 | 2/2000 | Rogers, Jr. et al. | 403/322.4 |

FOREIGN PATENT DOCUMENTS

| | | |
|---|---|---|
| 42 04 712 C2 | 5/1996 | Germany . |
| 195 44 833 A1 | 6/1997 | Germany . |
| 198 46 031 A1 | 4/1999 | Germany . |

*Primary Examiner*—Joseph D. Pape
*Assistant Examiner*—Mickki D. Murray
*Attorney, Agent, or Firm*—Brooks & Kushman PC

[57] ABSTRACT

An assembly for mounting a seat on a vehicle comprises a seat-side latching means (10) and a vehicle-side bolt (18) adapted to be inserted into the open latching means (10) up to an abutment whereby closing of said latching means (10) is brought about.

16 Claims, 4 Drawing Sheets

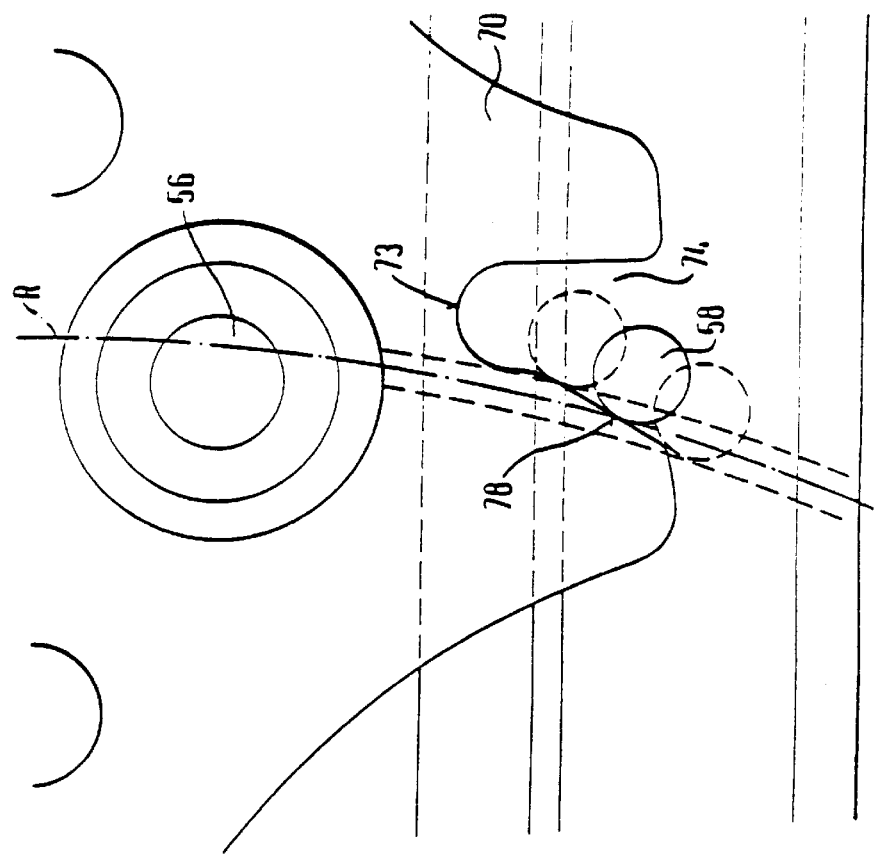
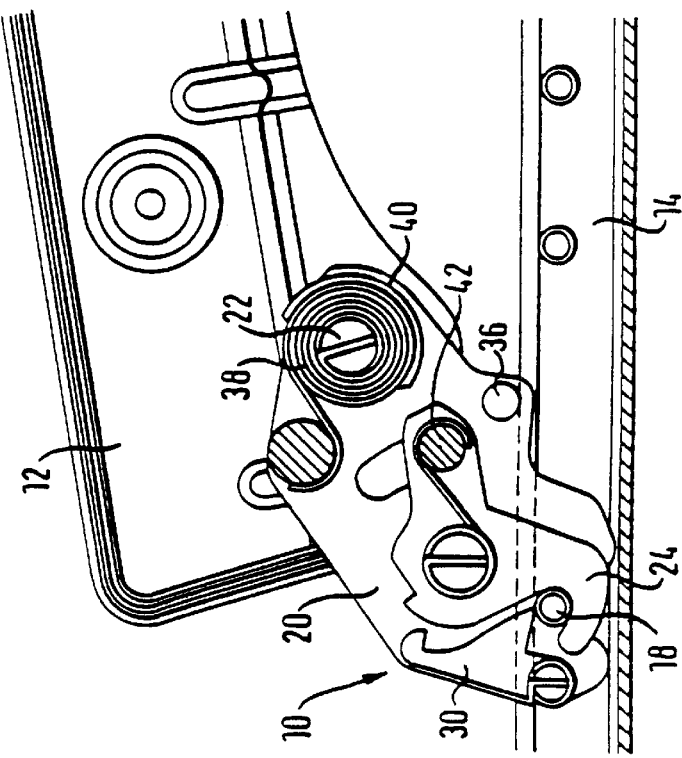

ASSEMBLY FOR MOUNTING A SEAT ON A VEHICLE

The present invention is directed to an assembly for mounting a seat on a vehicle in an easily detachable way. Such assemblies have been basically known and are intended for a simple and particularly quick mounting of a vehicle seat on a vehicle floor. Such assemblies are particularly used in mini buses in which the rearrangement of seats should be facilitated so that the space may be variably utilized.

The known seat mounting assemblies exhibit various drawbacks. For one, large forces are frequently necessary in order to latch the seat to a vehicle body. On the other hand, in some cases the separate and manual actuation of latching elements is required.

It is an object of the present invention to provide an assembly of the type specified above which allows readily releasable mounting of a seat on a vehicle in a simple and comfortable way with little additional force being required.

The specified object is achieved by the features of the independent claims.

According to the present invention there are provided at least one seat-side latching means and at least one vehicle-side bolt, said bolt being adapted for insertion into the open latching means up to an abutment thus causing the latching means to close. According to the invention, the latching means is therefore closed when the bolt engages the abutment whereby it is ensured that upon closing of the latching means the bolt will be in the desired terminal position. Also, the latching means is only closed when the bolt approaches the vicinity of the abutment so that the bolt need not be urged against a catch as is frequently the case with known assemblies of this kind.

Advantageous embodiments of the present invention are described in the specification, in the drawings and in the subclaims.

According to a first advantageous embodiment, the vicinity of the abutment is provided with a sensing element, for instance a release pawl, which upon actuation will trigger the closing of a catch, sensing element and catch being configured as separate parts. In this embodiment, release of the catch is not triggered by engagement or riding of the bolt along the catch, which is in contrast to the known solutions.

Rather, adjacent the catch a separate part is provided as a sensing element which may be configured as a release pawl. Due to the provision of a separate release pawl the lower portion of the catch may have a relatively simple design because it is only a latching effect and not a releasing effect that has to be achieved between the bolt and the catch.

According to a further embodiment of the present invention a catch of the latching means is kept in its open position by a release pawl, wherein the release pawl is preferably spring-loaded or biassed towards the catch. This embodiment allows latching with a particularly small force because the catch need not be urged away by the bolt. Rather, the catch is kept in the open position by the release pawl so that the bolt may be introduced into the latching means without any resilient forces of the catch having to be overcome.

In this connection it is advantageous when the release pawl is subjected to a lower spring loading than the catch which is triggered by the release pawl. In that case release of the catch may be effected with little force whereas the catch is kept in its locking position by a correspondingly greater force.

The abutment of the latching means may be constituted by a portion, preferentially the base, of a preferably essentially U-shaped cutout formed in a base plate of the latching means. A cutout of such design allows the bolt to be smoothly introduced into the latching means.

It is preferred that during insertion of the bolt into the open latching means and during contact between the bolt and the release pawl of the latching means there should be no contact between the bolt and the catch of the latching means. Thus, the design of the catch need not take into account any actuating engagement with the bolt, which is a significant advantage especially for embodiments liable to space limitations.

It is preferred that the mouth of the cutout, which is intended to receive the bolt, faces substantially towards the front of the seat when the seat is not in the mounted state.

According to another embodiment of the present invention there are provided a further seat-side latching means and a further vehicle-side bolt, said further bolt being insertable into the closed further latching means up to an abutment. This preferably permits first the opening and subsequently the closing of the further latching means.

The catches of the first or the further latching means may comprise two parallel-acting subcatches each loaded by a spring of its own, and especially one subcatch may have stronger dimensions than the other subcatch. It is thereby possible to optimize the structure and shape of the more strongly dimensioned subcatch in such a way that the subcatch—particularly in case of an accident—will absorb all occurring loads in the best way. This design is not, however, necessarily suitable to provide a mounting which is free from play, and therefore the other subcatch is provided which only serves to eliminate any play while it need not absorb any major loads.

The catch of the further latching means may be moved by means of a pivotable and spring-biassed pawl towards an open position whereby unlatching becomes possible. Consequently, the catch may be temporarily opened for instance by an unlatching handle or the like, so that the bolt may be removed from the further latching means. Subsequently, the unlatching handle may be released so that the pawl and the catch will move again towards the closed position due to the spring loading of the pawl.

The abutment of said further latching means may be a cutout in a base plate, a portion of the cutout preferably being formed as a ramp for the bolt.

It is especially advantageous when the entire latching means is mounted on a seat base so as to be pivotable about a horizontal axis and preferably loaded by a spring. This initially allows the latching means to be fixed to the bolt, whereupon the seat may be pivoted about the horizontal axis while the latching means itself is not or only partially pivoted. By means of a stop member provided on the base plate of the latching means it is possible to limit the pivotal movement of the base plate so that subsequently only the seat base may be pivoted.

In addition to the possibility of pivoting the seat base about the bolt, this also provides a further pivot for the seat base which is free from manufacturing tolerances and other inaccuracies, so that the slope of the ramp of the further latching means may be adapted to the position of said pivot which exists when the pivotal movement of the latching means has been limited by the stop member.

In this connection it is advantageous when an acute angle is enclosed between a radius about the axis, which intersects the ramp, and the ramp itself, said angle being preferably between about 1° and 45° and preferably between about 1° and 15°. This ensures that upon pivoting of the seat base into the bolt of the further latching means only small forces need be exerted even though there may exist manufacturing or mounting tolerances. Due to the pivotable mounting of the first latching means it is possible to balance even larger tolerances because the seat base may pivot both about the pivot axis and also about the bolt of the first latching means, which provides for possible compensation.

The vehicle-side counterstop for the stop member of the latching means may be disposed such that there is no contact between the stop member and the counterstop in the completely secured condition of the vehicle seat. This ensures that any possible tolerances are negligible because upon latching of the further latching means into the associated bolt the seat base may be pivoted both about the axis and about the bolt of the first latching means. At the same time any undesirable rattling of the stop member and the counterstop will be prevented.

With respect to the further latching means it is advantageous if upon pivoting of the seat base about the axis there will initially be contact between the ramp and the further bolt while as yet there should be no contact between the further bolt and the catch of the further latching means. This ensures that the subsequent engagement between the bolt and the catch of the further latching means always occurs at the same location and at the same angle so that latching will always require the same forces.

In order to prevent any inadvertent unlocking of the first latching means there may be provided a safety stop for blocking the catch of the first latching means when the vehicle seat is properly mounted. This permits the unlatching element of the first latching means to be configured in such a way as to be within comfortable reach, because any inadvertent unlatching through the safety stop is prevented.

It is particularly advantageous when the safety stop together with the base plate of the first latching means is pivotable about the axis, because pivoting the seat into its terminal position will automatically move the safety stop to a blocking position in which it prevents unlatching of the first latching means. Consequently, the first latching means can be opened only when the bolt has been removed from the further latching means or the latter has been removed from the bolt, respectively.

Below, the present invention will be described by way of example only with reference to an advantageous embodiment thereof and to the accompanying drawings, in which:

FIG. 3 is a partial view of the assembly of FIG. 1 during the mounting operation;

FIG. 4 is an enlarged view illustrating the engagement of the further bolt with the further latching means, the catch having been omitted for reasons of clarity.

Figure 1:
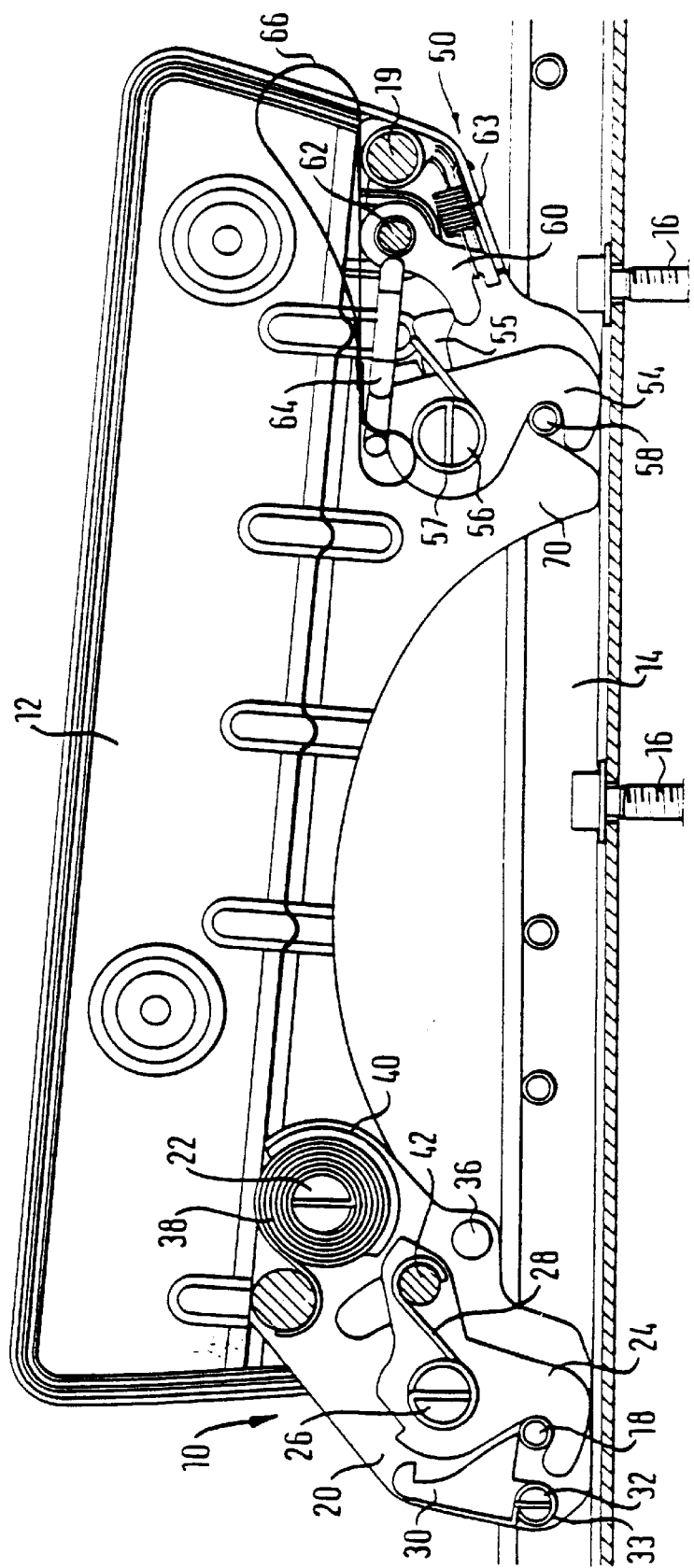
FIG. 1 is a side view of an assembly for mounting a seat on a vehicle.

FIG. 1 is a side view of an assembly according to the present invention for an easily detachable mounting of a seat on a vehicle, said assembly comprising a seat base 12 having a first latching means 10 disposed on the front side thereof and a second or further latching means 50 on the rear side thereof. Both latching means 10 and 50 are secured to a rail or runner 14 which is bolted to a vehicle floor by means of screws 16. Bolts 18 and 58 extending transversely to the longitudinal direction of the runner 14 are secured to said runner and have said first and second latching means 10 and 50 co-operating therewith so as to fix the seat to the vehicle.

The seat mounting arrangement illustrated in FIG. 1 comprises a total of two seat bases 12 (only one seat base being illustrated) each of which includes first and second latching means 10 and 50, respectively. The two seat bases are joined via a connecting member 19 to form a frame. Also, further pairs of bolts are provided in the runner 14 or runners, respectively, so that the seat may be mounted at different positions within the vehicle.

Below, the structure of the first latching means 10 will be described. Said latching means comprises a base plate 20 adapted for pivotal movement relative to the seat base 12 about a shaft 22 having a pivot axis. On the base plate 20 there is disposed a catch 24 which is pivotable relative to the base plate 20 about a shaft 26. The catch 24 is biassed by a spring 28 towards the closed position illustrated in FIG. 1.

A release pawl 30 is provided so as to keep the catch 24 in an open position, said release pawl being pivotable against the action of a spring 33 about a shaft 32 mounted on the base plate 20.

Figure 2:
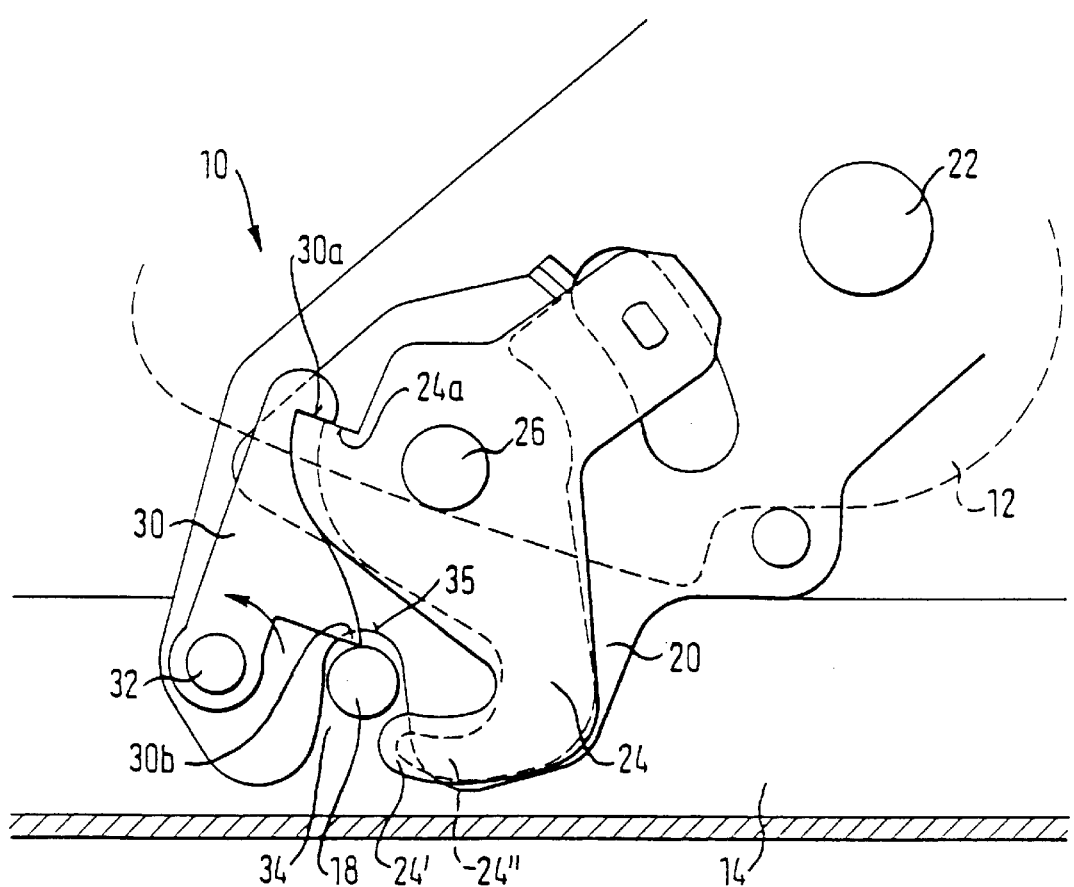
FIG. 2 is an enlarged detailed view of the first latching means of FIG. 1 in a state immediately before latching.

FIG. 2 shows an enlarged detailed view of the first latching means 10 in which several elements have been omitted in order to simplify the illustration. The figure shows a mounting situation in which the assembly according to the present invention with the seat-side first latching means 10 is fitted onto the vehicle-side bolt 18 so as to cause engagement of the latching means 10. FIG. 2 illustrates the position immediately prior to engagement of the first latching means 10.

As will be apparent, the catch 24 is maintained in the open position against its spring action by the release pawl 30. To this end the release pawl 30 includes a hook portion 30a which is engaged with a complementary hook portion 24a of the catch 24 whereby any rotation of the catch (in the clockwise direction in FIG. 2) is prevented. As the release pawl 30 is loaded in the clockwise sense by the action of the spring 33 (FIG. 1) the catch 24 will always be kept in the open position.

As will also be apparent from FIG. 2, a sensing portion 30b is provided on the release pawl 30 and is used to trip the latching means 10, as will be described in further detail.

The base plate 20 of the first latching means 10 comprises a cutout 34 which basically is substantially U-shaped, the leg ends of the cutout 34 opening outwardly in convex fashion. The base of the U has a concave curvature and is adapted to the cross-section of the bolt 18.

As will be apparent from FIG. 2 the latching means 10 may be fitted onto the bolt 18 so that the bolt is received within the cutout 34 of the base plate 20. As will be further apparent the sensing portion 30b of the release pawl 30 protrudes to some extent into the cutout 34, namely in the region of the base of the U. This provides for contact between the bolt 18 and the sensing portion 30b of the release pawl as the latching means 10 is fitted onto the bolt 18 and the latter comes near the abutment formed by the base 35. At the same time it will be apparent that in this position there is no contact between the bolt 18 and the catch 24.

As the latching means 10 or the seat base 12 is moved somewhat further downward from the position illustrated in FIG. 2, the release pawl 30 will be rotated counterclockwise by the bolt 18 in the direction of the arrow about the shaft 32 so that the hook portion 30a of the release pawl 30 will be disengaged from the hook portion 24a of the catch 24 whereby the latter is rotated clockwise due to the action of the spring 28 (FIG. 1) and takes the position illustrated in FIG. 1, in which the hook-like extension of the catch 24 comes into engagement beneath the bolt 18 so that the latching means 10 will be secured to the bolt 18.

It will be apparent from FIG. 2 that the catch is composed of two parallel-acting subcatches 24' and 24" which operate in parallel and are each biassed by springs of their own.

FIG. 3 shows the seat base 12 after the first latching means 10 has been secured to the bolt 18. Following such latching the seat base 12 may initially be pivoted about the bolt 18 until a stop 36 secured to the base plate 20 comes into contact with the runner 14 (or some other counterstop counted on the vehicle). Subsequently, the seat base 12 may be pivoted further in a clockwise direction about the axis of the shaft 22 against the action of a flat spiral spring 38. Due to this further pivotal movement the second latching means 50, which is secured to the rear of the seat base 12, may be locked with the bolt 58 as will be described below in detail with reference to FIGS. 1, 4 and 5.

The further or second latching means 50 illustrated in FIG. 1 which is secured to the rear of the seat base 12 and comes into latching engagement with the vehicle-side bolt 58 comprises a catch 54 adapted to be pivoted about a shaft 56 against the action of a spring 57. Although not specifically illustrated, the catch 54 is also composed of two parallel-acting subcatches which operate in parallel and are each biassed by springs of their own. One subcatch is used to eliminate any play while the other subcatch is used for secure mounting.

The catch 54 comprises a hook portion 55 for co-operation with a pawl 60 which is pivotally mounted on the seat base 12 and engages an abutment stop 75 formed on the base plate 70. By way of a transverse rod 62 which is joined to the pawl 60, and an actuating lever 64 to which (for example) a looped pull cord 66 is attached, the pawl 60 may be moved in a clockwise direction against the action of the spring 63 whereby the catch 54 may be rotated counter-clockwise so as to temporarily open the second latching means 50.

FIG. 4 is a simplified illustration of the base plate 70, of the second latching means 50, said base plate being integrally joined to the seat base 12. As will be apparent, the base plate 70 also has a substantially U-shaped cutout 74 the base 73 of which forms an abutment and is adapted to the cross-section of the bolt 58. The left-hand leg of the U in FIG. 4 is however angled and constitutes a straight ramp 78.

Figure 5:
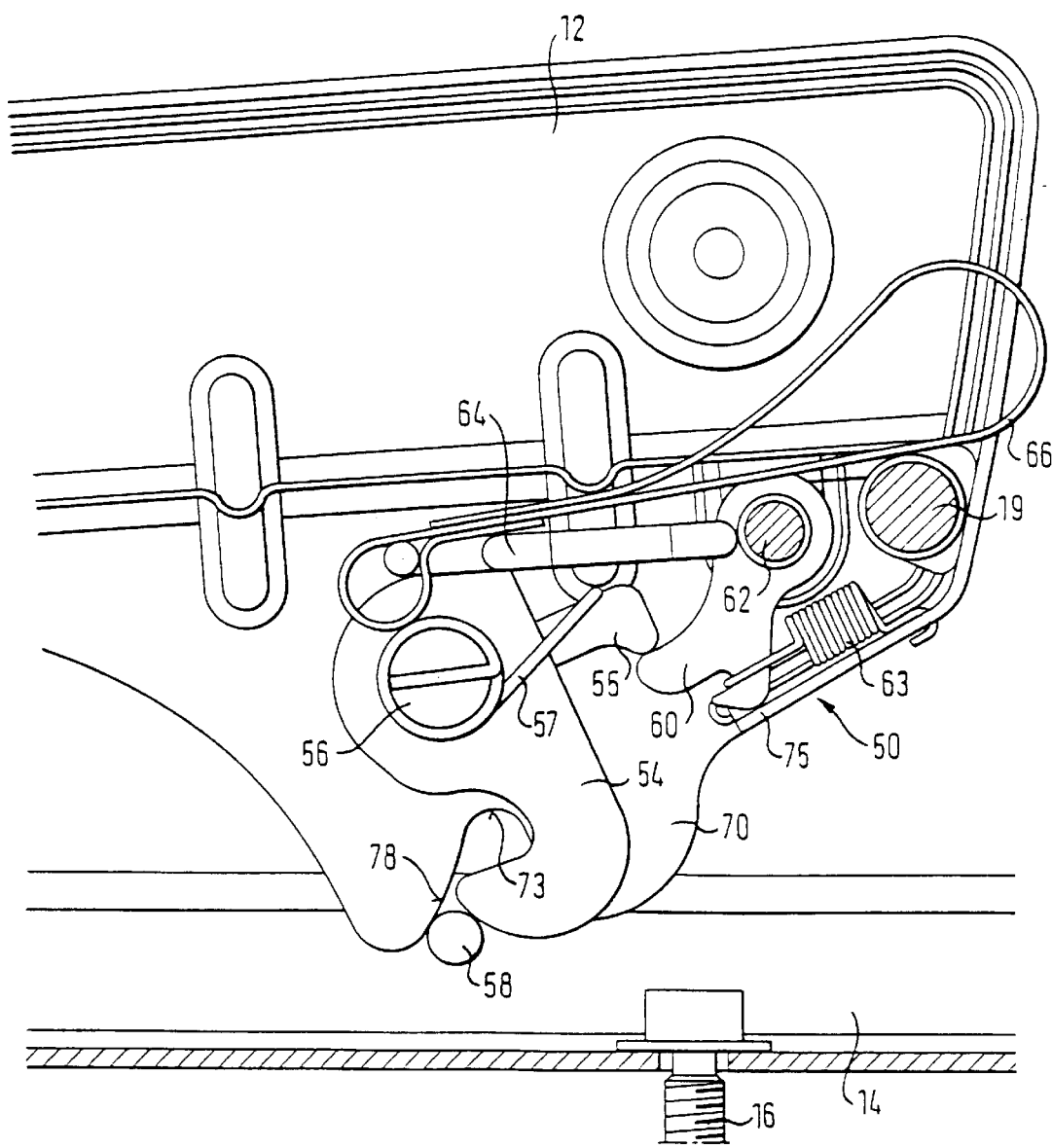
FIG. 5 is an enlarged section of the assembly of FIG. 1 shortly before latching of the further latching means.

FIG. 5 is an enlarged view showing a position of the seat base 12 shortly before the second latching means 50 is locked. As will be apparent, the second latching means 50 is normally in a closed state in which the catch 54 is urged by the spring 57 towards the locked position. Any further movement of the catch 54 is prevented by the pawl 60 which engages the abutment 75 of the base plate 70.

Below, the way of mounting the assembly according to the present invention on a vehicle will be explained, and for simplicity's sake reference will be made to only one latching means and one bolt. However, it will be apparent that in the described embodiment the components 10 and 50 as well as 14, 18 and 58 are each provided in pairs.

In order to secure the seat base 12 to the bolts 18 and 58 mounted on the vehicle, the seat base is initially pivoted (see FIG. 2) such that the cutout 34 of the first latching means 10 may be fitted from above onto the fixed bolt 18. When the bolt 18 is located near the base 35 of the cutout 34 serving as an abutment, the release pawl 30 is rotated counterclockwise (in the direction of the arrow in FIG. 2) against the action of the spring 33.

Thereby the hook portion 30a of the release pawl 30 and the hook portion 24a of the catch 24 will become disengaged so that the catch 24 is pivoted clockwise about the shaft by the action of the spring 28 to lock the bolt 18 within the cutout 34, the spring 57 generating the required prestress.

Subsequently, the seat base 12 may be further pivoted clockwise about the bolt 18 until the stop member 36, which is disposed on the base plate 20 of the first latching means 10, abuts the associated counterstop member (which is the runner 14 in the illustrated embodiment) (see FIG. 3) so that the pivotal movement about the bolt 18 will be inhibited. Further pivoting of the seat base 12 is possible about the axis of the shaft 22, in which case the seat base 12 will have to be pivoted downwardly against the action of the spring 38.

Following further pivoting of the seat base 12, the ramp 78 of the second latching means 50 comes into the vicinity of the rear bolt 58 (see FIGS. 4 and 5). Further depression of the seat base 12 causes the ramp 78 to ride atop the bolt 58 until the catch 54 engages the bolt 58 (see FIG. 5).

Further application of force will cause the catch 54 of the second latching means 50 to be urged away by the bolt 58 and to be opened so that the bolt 58 will be locked within the second latching means 50 due to the catch 54 again engaging behind the bolt 58 (see FIG. 1).

As will be apparent especially from a comparison of FIG. 1 with FIG. 3, in the fully latched state the stop member 36 has again moved away from the runner 14 so that the seat base 12 is retained merely between the bolts 18 and 58. Due to the action of the spring 38 the base plate 20 is clamped to the seat base 12 so as to ensure jolt-free mounting.

In order to detach the seat base 12 from the bolts 18 and 58 the latching means 50 will initially have to be opened by pulling the looped pull cord 66. Thereby the pawl 60 is pivoted clockwise via the actuating lever 64 whereby the locking hook 54 will be moved to the open position so that the seat base 12 may be pivoted counterclockwise.

When the looped pull cord 66 is released the catch 54 will close again and the seat base 12 may be further pivoted counterclockwise about the axis of the shaft 22 (see FIG. 3).

This also causes a safety stop 40 (see FIGS. 1 and 3) to be pivoted relative to the base plate 20, said safety stop in its properly secured state preventing pivoting of the catch 24 of the first latching means 10. This ensures that the first latching means 10 can only be opened after the seat base 12 has been pivoted to its removal position.

The first latching means 10 can be opened by using a handlebar 42 which is secured to the catch 24 (in the illustrated embodiment it is mounted on both catches 24 of the two forward latching means 10). Thus, the catch 24 may be moved to the open position so that the bolt 18 is released and the release pawl 30 arrests the catch 24 so that the latter will remain in the open position.

There are various advantages provided by the above-described mounting of a seat on a vehicle. First of all, mounting may be effected easily and conveniently because the force required to latch the first latching means 10 is independent of and substantially less than the force exerted by the catch 24 for latching. The lower portion of the catch may be of relatively simple design because upon latching the bolt 18 will not ride along the catch 24 as would be the case with many conventional solutions.

Moreover, the first latching means 10 is always open when no bolt 18 is disposed therein, so that there is no separate opening operation. Only two manual operations are required to release the seat base from the vehicle, i.e. pulling of the looped pull cord 66 and actuating the handlebar 42. As the handlebar 42 is disposed intermediate two catches 24 of the two forward latching means 10, these may be opened jointly and simultaneously by only one manual operation.

As the catch 24 of the forward latching means 10 in the mounted state is blocked by the safety stop 40, the first latching means 10 cannot be opened inadvertently. Furthermore, the second latching means 50 is disposed on the back of the seat so that it cannot be released inadvertently by a person occupying the seat.

Another advantage resides in the design of the ramp 78 which is illustrated in FIG. 4, and in the pivotable mounting of the first latching means 10 on the seat base 12. As illustrated in FIG. 4, the actually straight ramp extends at an angle to a radius R about the axis of the shaft 22, the enclosed angle being from approximately 1° to 15°.

As will be further apparent from FIG. 5, during the mounting operation the bolt 58 will always initially contact the ramp 78 and only then come into contact with the catch 54. This ensures that the bolt 58 will always contact the catch 54 at the same position and in the same direction or at the same angle, respectively, whereby the shape of the catch 54 can be optimized so that by depressing the seat base 12 the catch is easily opened by the bolt 58.

Moreover, it is a characteristic of the assembly according to the present invention that tolerances may be compensated. As described above, upon closing the seat base 12 will rotate about the axis of the shaft 22 when the stop member abuts its countermember mounted on the vehicle. Thereby the position of the shaft axis 22 is always accurately defined, because any play in the vicinity of the first latching means 10 and also any manufacturing tolerances are eliminated.

As the ramp 78 subsequently approaches the bolt 58 there will in any case be an initial contact between the bolt 58 and the ramp 78 even though manufacturing tolerances might be present (see FIG. 4). Due to the ramp 78 riding across the bolt 58, the seat base 12 will be moved to some extent towards the first latching means 10 whereby a pivotal movement both about the axis of the shaft 22 and about the bolt 18 may take place so that the stop member 36 will again come away from its counter-member (see FIG. 1).

What is claimed is:

1. An assembly for the easily detachable mounting of a seat on a vehicle, comprising
   - at least one latch pivotally connected to the seat, the latch including a base plate, a catch connected to the base plate, and a release pawl connected to the base plate, and
   - at least one bolt (18),
   - wherein the bolt (18) is capable of being inserted into the open latch and upon actuation of the release pawl triggers closing of the latch,
     - the base plate having a stop, and the seat pivoting with respect to the latch when the stop engages a counterstop;
   - wherein the release pawl is biased with a spring force smaller than a spring force biasing the catch.

2. The assembly as claimed in claim 1 wherein the sensor comprises a release pawl.

3. The assembly as claimed in claim 1 wherein the catch is spring-loaded.

4. The assembly as claimed in claim 3 wherein the catch is kept in an open position thereof by a release pawl.

5. The assembly as claimed in claim 4 wherein the release pawl is actuated by the bolt.

6. The assembly as claimed in claim 4 wherein the release pawl is biased by a spring towards the catch.

7. The assembly as claimed in claim 1 further comprising a rod connected between the latch and a second latch.

8. The assembly as claimed in claim 1 wherein the base plate has an approximately U-shaped cutout.

9. The assembly as claimed in claim 8 wherein the cutout has a mouth which faces substantially towards the front of the seat when the seat is not installed.

10. The assembly as claimed in claim 1 wherein the catch includes two parallel-acting subcatches each being biased by a spring of its own.

11. The assembly as claimed in claim 1 further comprising a second latch and a second bolt, the second bolt being insertable into the closed second latch up to an abutment, thereby initially causing opening and subsequently closing of the second latch.

12. The assembly as claimed in claim 11 further comprising a second catch and a pivotable pawl for moving the second catch to an open position.

13. The assembly as claimed in claim 12 wherein the catch and the pawl are pivotally disposed on a base plate.

14. The assembly as claimed in claim 13 wherein the base plate has a ramp.

15. The assembly as claimed in claim 1 wherein the first latch is disposed on a front side of the seat and the second latch is disposed on a rear side of the seat.

16. An assembly for the easily detachable mounting of a seat of a vehicle, comprising:
   - at least two latches pivotally connected to the seat, each latch including a base plate, a catch connected to the base plate, and a release pawl connected to the base plate;
   - at least two bolts;
   - wherein each of the bolts is insertable into a respective latch and upon actuation of an associated sensor trigger closing of the latch, at least one of the base plates having a stop, and seat pivoting with respect to the latches when the stop engages a counterstop; and
   - wherein the release pawl is biased with a spring force smaller than a spring force biasing the catch.

\* \* \* \* \*